(12) United States Patent
Rahe et al.

(10) Patent No.: US 12,213,398 B2
(45) Date of Patent: Feb. 4, 2025

(54) METHOD FOR DETERMINING THE INFLUENCE OF THE INCLINATION OF AN AGRICULTURAL SPREADER ON THE DISTRIBUTION PATTERN

(71) Applicant: AMAZONEN-WERKE H. DREYER SE & CO. KG, Hasbergen (DE)

(72) Inventors: Florian Rahe, Lotte (DE); Hubertus Kleine-Hartlage, Bad Iburg (DE); Stefan Jan Johannaber, Lienen (DE); Jörn Albert, Osnabrück (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 953 days.

(21) Appl. No.: 17/272,059

(22) PCT Filed: Aug. 27, 2019

(86) PCT No.: PCT/EP2019/072777
§ 371 (c)(1),
(2) Date: Feb. 26, 2021

(87) PCT Pub. No.: WO2020/043694
PCT Pub. Date: Mar. 5, 2020

(65) Prior Publication Data
US 2021/0337722 A1    Nov. 4, 2021

(30) Foreign Application Priority Data

Aug. 28, 2018  (DE) .......................... 102018120948.7
Aug. 22, 2019  (EP) ..................................... 19401031

(51) Int. Cl.
*A01C 17/00*    (2006.01)
*A01C 5/06*     (2006.01)
(Continued)

(52) U.S. Cl.
CPC .............. *A01C 17/008* (2013.01); *A01C 5/06* (2013.01); *A01C 7/04* (2013.01); *G01C 9/00* (2013.01)

(58) Field of Classification Search
CPC ................................ A01C 17/008; G01C 9/00
See application file for complete search history.

(56) References Cited

U.S. PATENT DOCUMENTS 3,272,159 A  *  9/1966  Sanderson ............... A01C 7/04
                                              222/371
4,351,481 A  *  9/1982  Dreyer .................. E01C 19/203
                                              239/670
(Continued)

FOREIGN PATENT DOCUMENTS

DE        10145927 A1      4/2003
DE     102012111144 A1  *  5/2014  .......... A01C 17/006
(Continued)

OTHER PUBLICATIONS

Amirani, M., "Automated sensor platform for distribution pattern characterization of agricultural equipment", 2013, Louisiana State University Master's Theses. 1435. (Year: 2013).*
(Continued)

*Primary Examiner* — Mohammad Ali
*Assistant Examiner* — Kelvin Booker
(74) *Attorney, Agent, or Firm* — Potomac Law Group, PLLC; John J. Penny, Jr.

(57) ABSTRACT

The invention relates to a method for detecting the influence of the inclination ($\alpha 1$-$\alpha 4$) of an agricultural spreading device (100, 102) on the distribution of the material to be spread, having the steps of: receiving discharge information on spreading processes of agricultural spreading devices (100) using an analysis device (10) and ascertaining a relationship between a dispensing point of material to be spread onto at least one distribution disc (104, 106, 108, 110)
(Continued)

of an agricultural spreading device and the distribution of material to be spread, said relationship depending on the inclination of an agricultural spreading device, using the analysis device on the basis of the received discharge information.

13 Claims, 1 Drawing Sheet

(51) Int. Cl.
*A01C 7/04* (2006.01)
*G01C 9/00* (2006.01)

(56) References Cited

U.S. PATENT DOCUMENTS

| | | | | |
|---|---|---|---|---|
| 4,522,340 A * | 6/1985 | Gandrud | ............... | A01C 15/04 |
| | | | | 222/311 |
| 5,655,468 A * | 8/1997 | Ledermann | ........... | A01C 7/044 |
| | | | | 285/8 |
| 5,802,994 A * | 9/1998 | Kinkead | ................. | A01C 7/06 |
| | | | | 221/253 |
| 5,915,313 A * | 6/1999 | Bender | ............... | A01C 21/005 |
| | | | | 111/178 |
| 6,267,067 B1 * | 7/2001 | Mayerle | ................. | A01C 7/102 |
| | | | | 111/170 |
| 8,752,490 B2 * | 6/2014 | Beaujot | ................... | A01C 7/04 |
| | | | | 111/178 |
| 8,789,482 B2 * | 7/2014 | Garner | ................. | A01C 7/046 |
| | | | | 111/171 |
| 9,137,941 B2 * | 9/2015 | Stark | ...................... | A01C 5/068 |
| 9,591,798 B2 * | 3/2017 | Horsch | ................. | A01C 7/042 |
| 9,596,802 B2 * | 3/2017 | Funck | ...................... | A01C 7/04 |
| 9,814,177 B2 * | 11/2017 | Lietaer | ................... | A01C 7/008 |
| 9,820,431 B2 * | 11/2017 | Conrad | ............... | A01M 9/0092 |
| 10,021,825 B2 * | 7/2018 | Haselhoff | ................ | A01C 7/04 |
| 10,334,773 B2 * | 7/2019 | Donolo | ................. | A01C 7/081 |
| 2009/0314191 A1 * | 12/2009 | Friggstad | ............... | A01C 7/081 |
| | | | | 111/178 |
| 2012/0232691 A1 * | 9/2012 | Green | .................... | A01C 7/203 |
| | | | | 700/231 |
| 2012/0275888 A1 * | 11/2012 | Claussen | .............. | B65G 41/005 |
| | | | | 414/304 |
| 2014/0263713 A1 | 9/2014 | Stocklin et al. | | |
| 2014/0303814 A1 * | 10/2014 | Burema | ................. | A01C 21/00 |
| | | | | 901/1 |
| 2015/0059626 A1 * | 3/2015 | Conrad | ............... | A01M 9/0092 |
| | | | | 111/120 |
| 2016/0307448 A1 * | 10/2016 | Salnikov | ............... | G08G 5/0043 |
| 2017/0029109 A1 * | 2/2017 | Chase | .................... | A01C 17/00 |
| 2017/0295716 A1 * | 10/2017 | do Amaral Assy | ...... | A01C 7/04 |
| 2018/0317379 A1 * | 11/2018 | Pirkenseer | ............. | A01C 7/084 |

FOREIGN PATENT DOCUMENTS

| | | | | |
|---|---|---|---|---|
| EP | 2213152 A1 * | 8/2010 | ............ | A01C 21/00 |
| EP | 3152993 A1 | 4/2017 | | |
| EP | 3305055 A1 | 4/2018 | | |
| ES | 2283285 T7 * | 3/2016 | ............... | A01C 5/06 |
| FR | 2882496 A1 | 9/2006 | | |
| RU | 124527 U1 * | 2/2013 | ............ | A01C 15/10 |
| WO | WO-8500345 A * | 1/1985 | ............ | A01C 15/04 |
| WO | WO-9842178 A1 * | 10/1998 | ........... | A01B 79/005 |
| WO | WO-2015168759 A1 * | 11/2015 | ............ | A01C 7/081 |
| WO | WO-2016055852 A1 * | 4/2016 | ............ | A01C 7/046 |

OTHER PUBLICATIONS

International Search Report, PCT/EP2019/072777, dated Nov. 12, 2019, 5 pages.
Australian Examination Report, AU2019327161, dated Feb. 28, 2022, 5 pages.

* cited by examiner

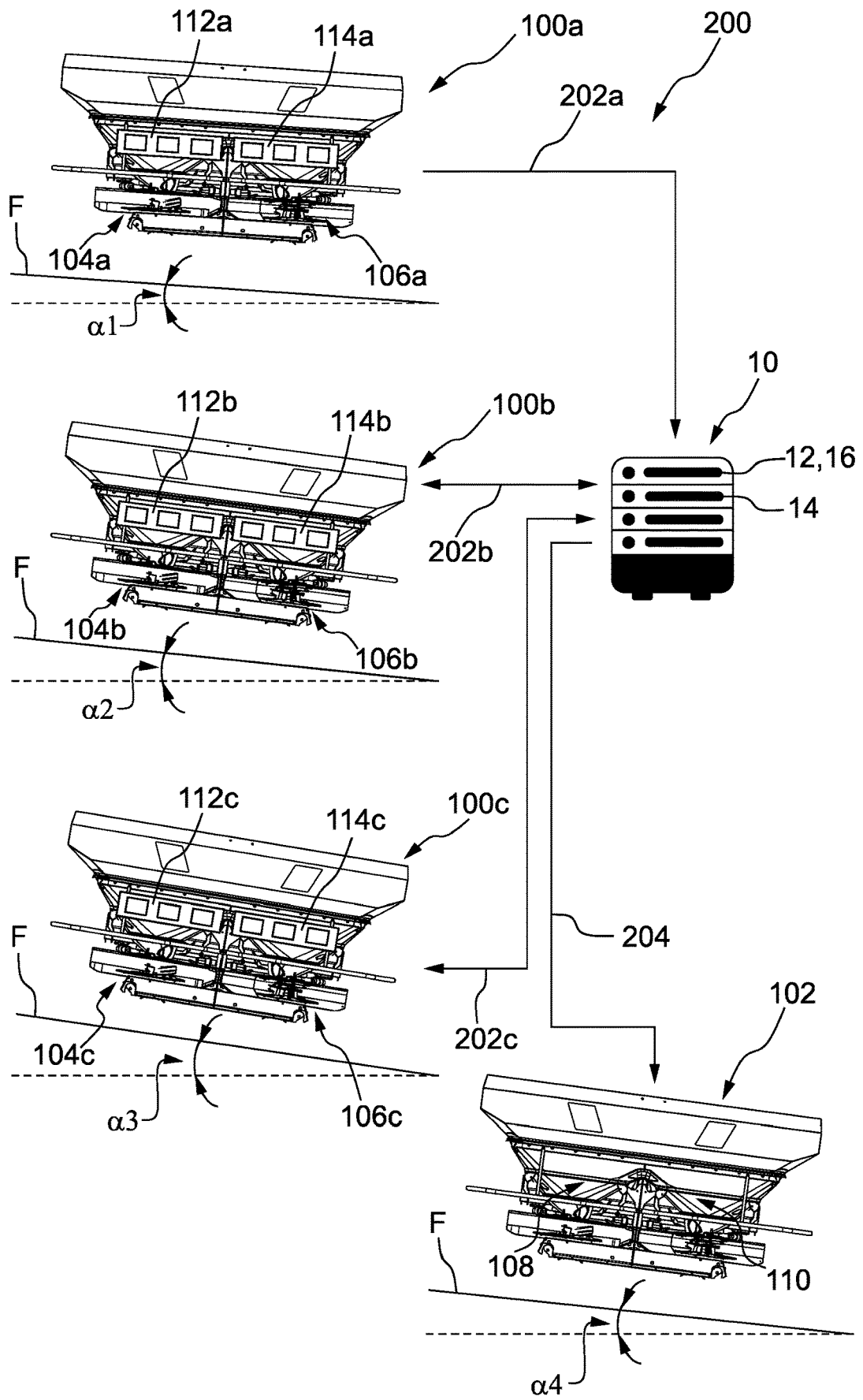

METHOD FOR DETERMINING THE INFLUENCE OF THE INCLINATION OF AN AGRICULTURAL SPREADER ON THE DISTRIBUTION PATTERN

CROSS-REFERENCE TO RELATED APPLICATIONS

The present application is a National Stage Entry of International Application PCT/EP2019/072777 filed on Aug. 27, 2019, which claims priority to German Application DE 10 2018 120 948.7 filed on Aug. 28, 2018 and European Application 19401031.0 filed on Aug. 22, 2019. The aforementioned applications are incorporated herein by reference in their entireties.

The invention relates to a method for detecting the influence of the inclination of an agricultural spreading device on the distribution of material to be spread according to the preamble of patent claim 1, a method for discharging material to be spread with an agricultural spreading device according to the preamble of patent claim 12, and an analysis device for detecting the influence of the inclination of an agricultural spreading device on the distribution of material to be spread according to the preamble of patent claim 13.

In the distribution of material to be spread on usable agricultural areas, agricultural spreading devices are employed in which material to be spread is dispensed onto a distribution disc driven to rotate, wherein the distribution disc accelerates and ejects the dispensed material to be spread. The dispensing point, i. e. the region where the material to be spread hits the rotating distribution disc, influences the distribution of material to be spread substantially. For this reason, the dispensing point must be adjusted as precisely as possible before or during a spreading process, so that the intended distribution of material to be spread is realised.

If the distribution of material to be spread is accomplished on an inclined usable agricultural area, the dispensing point of material to be spread onto the distribution disc will change due to the inclination of the spreading device and the free-falling height of material to be spread, resulting in a change of the distribution of material to be spread, in particular a change of the ejection angle.

From citations DE 41 34 315 A1, EP 0 540 889 A1, and EP 0 330 839 A1, it is already known that a change of the dispensing point of material to be spread onto the distribution disc causes a change of the ejection angle of material to be spread.

DE 10 2012 111 144 A1 suggests, in order to compensate the change of the dispensing point of material to be spread onto the distribution disc during a discharge process on an inclined usable agricultural area, to adjust the metering opening for the material to be spread disposed above the distribution disc in response to the machine's inclination to ensure a uniform flow rate.

Furthermore, agricultural spreading devices are known which monitor the fan for the material to be spread during the discharge process by means of suited sensors. It can thus be determined whether the adjustment of the dispensing point depending on the inclination actually leads to the adjustment of the desired distribution of material to be spread. If the detection of the spreading fan determines that, despite an adjustment of the dispensing point depending on the inclination, a faulty discharge occurs, a corresponding correction of the dispensing point can be accomplished by the spreading device during the discharge process, so that the intended distribution of material to be spread is realised.

The existence of corresponding systems already shows that the influence of the inclination of an agricultural spreading device on the distribution of material to be spread cannot yet be determined with satisfactory precision. This also involves the problem that spreading devices which do not have corresponding monitoring means for the spreading fan do not yet have any open- or closed-loop control means which permit a precise discharge of material to be spread on an inclined usable agricultural area.

It is thus the object of the present invention to be able to more precisely ascertain the influence of the inclination of an agricultural spreading device on the distribution of material to be spread, so that faulty discharges onto inclined usable agricultural areas can be further reduced.

This object is achieved by a method for detecting the influence of the inclination of an agricultural spreading device on the distribution of material to be spread of the type mentioned in the beginning, wherein discharge information on spreading processes are received by agricultural spreading devices by an analysis device, and a relationship between a dispensing point of material to be spread onto at least one distribution disc of an agricultural spreading device and a distribution of material to be spread, said relationship depending on the inclination of an agricultural spreading device, is ascertained by the analysis device on the basis of the received discharge information.

The object utilises the knowledge that discharge information can be utilised for a plurality of spreading processes of agricultural spreading devices to be able to precisely ascertain the influence of the inclination of an agricultural spreading device on the distribution of material to be spread. By the inventive method, discharge information on spreading processes recorded in practice of different spreading devices at different times and/or at different places are analysed, so that the resulting findings reflect the relationship between the dispensing point of material to be spread and the distribution of material to be spread during the discharge of material to be spread on an inclined usable agricultural area essentially more precisely than is possible by individual laboratory tests or mathematic calculations. The analysis device which receives and analyses the discharge information can be, for example, part of a central computer system, in particular a server device.

Preferably, the relationship between the dispensing point of material to be spread onto the at least one distribution disc of the agricultural spreading device and the distribution of material to be spread, said relationship depending on the inclination of the agricultural spreading device, also considers the disc speed of the at least one distribution disc.

In a preferred embodiment of the method according to the invention, the discharge information include indications on the inclination of the respective agricultural spreading device, indications on the adjusted dispensing point of material to be spread onto at least one distribution disc of the respective agricultural spreading device, and/or indications on the distribution of material to be spread during the respective spreading process. The dispensing point influences the residence time of material to be spread on the distribution disc and thus the ejection direction of material to be spread. As an alternative or additionally, the discharge information can include indications on the disc speed of the at least one distribution disc of the respective agricultural spreading device during the respective spreading process.

The disc speed influences the kinetic energy introduced into the material to be spread and thus the ejection range of material to be spread.

In order for the analysis device to be able to ascertain the influence of the inclination of an agricultural spreading device on the distribution of material to be spread, the discharge information underlying the ascertainment should be suited to detect a corresponding relationship between the device's inclination, dispensing point and distribution of material to be spread.

In a further development of the method according to the invention, the indications on the distribution of material to be spread during the respective spreading process include indications on the ejection angle of material to be spread, indications on properties of at least one spreading fan, and/or indications on the intended and/or actual working width during the respective spreading process. The indications on the ejection angle during the respective spreading process can be, for example, corresponding angle indications or indications from which the ejection angle of material to be spread can be ascertained. The indications on properties of the at least one spreading fan can include, for example, indications on the shape of the spreading fan during the respective spreading process.

By means of the disc speed or the dispensing point, for example, the transverse distribution, in particular the ejection direction and the ejection range, can be influenced. For a suited influence on the transverse distribution to improve the spreading result to be realised the detection and recording of the transverse distribution, in particular the ejection direction and the ejection range, are necessary. This can be done, for example, by means of one or more optical sensors and/or by means of one or more radar sensors of the respective spreading device. By means of the ejection direction and the ejection range, thus the working width can also be adapted during the discharge process.

In a further development of the method according to the invention, the discharge information include indications on the distribution disc type used during the respective spreading process, and/or indications on the distribution disc configuration during the respective spreading process. The employed distribution disc type substantially influences the distribution of material to be spread. For this reason, it is preferred for the analysis device to consider, during the ascertainment of the influence of the inclination of an agricultural spreading device on the distribution of material to be spread, which distribution disc type was used in the respective analysed discharge processes. Furthermore, distribution discs can have different configurations. In particular, guide or baffle elements can be adjusted or changed. Since the configuration of distribution discs also substantially influences the distribution of material to be spread, it is preferred to also consider the distribution disc configuration in the detection of the influence of the inclination of an agricultural spreading device on the distribution of material to be spread.

In a further preferred embodiment of the method according to the invention, the discharge information include indications on the type of material to be spread, in particular a class designation of material to be spread. The properties of material to be spread, in particular the grain size, the grain weight, the grain shape and the surface quality, also substantially influence the distribution of material to be spread, so that corresponding indications also have to be considered in the ascertainment of the influence of the inclination of an agricultural spreading device on the distribution of material to be spread. By the discharge information made available to the analysis device comprising a class designation of the discharged material to be spread, the analysis can be performed by the analysis device specific to the classes. A falsification of the results by differing flight properties of different types or classes of material to be spread is thus prevented.

In another preferred embodiment of the method according to the invention, a dispensing point profile depending on the inclination is ascertained by the analysis device, the dispensing point profile depending on the inclination permitting agricultural spreading devices to adjust the dispensing point depending on a detected inclination. As an alternative or in addition, the dispensing point profile depending on the inclination is provided for retrieval, in particular online retrieval, by agricultural spreading devices. Spreading devices which do not have a device for monitoring the distribution of material to be spread during the discharge process can use the dispensing point profile depending on the inclination during the discharge of material to be spread on inclined usable agricultural areas to further increase the precision of the discharge of material to be spread. As an alternative or in addition to the ascertainment and provision of a dispensing point profile depending on the inclination, a relationship between the dispensing point of material to be spread onto at least one distribution disc of an agricultural spreading device, said relationship depending on the inclination of an agricultural spreading device, can be ascertained and made available for retrieval, in particular for online retrieval, by agricultural spreading devices. The dispensing point profile depending on the inclination can also consider the disc speed, such that the dispensing point profile depending on the inclination permits agricultural spreading devices to adjust the dispensing point and the disc speed in response to a detected inclination. As an alternative or in addition, within the scope of the method according to the invention, a disc speed profile depending on the inclination is ascertained by the analysis device, wherein the disc speed profile depending on the inclination permits agricultural spreading devices to adjust the disc speed in response to a detected inclination.

In a further embodiment of the method according to the invention, discharge information on a spreading process are detected and/or recorded by one or more agricultural spreading devices. Preferably, the detected and/or recorded discharge information are sent from the respective spreading devices to the analysis device. The detection and/or recording of the discharge information is preferably accomplished by different agricultural spreading devices at different locations and/or at different points in time. By sending the detected and/or recorded discharge information from the respective spreading devices to the analysis device, the discharge information required for ascertaining the influence of the inclination of an agricultural spreading device on the distribution of material to be spread are provided for the analysis device.

Preferably, a method according to the invention is moreover known, wherein the detection of discharge information on a spreading process by one or more agricultural spreading devices includes the detection, in particular the continuous detection, of the inclination of the respective agricultural spreading device during the respective spreading process. The detection of the inclination is preferably performed by means of a suited inclination sensor of the respective agricultural spreading device. As an alternative or in addition, the inclination of the respective agricultural spreading device can also be deducted from maps containing information on inclinations. In this case, the detection of the inclination normally includes the detection of the location of the respective agricultural spreading device, so that the inclination at the location of the respective agricultural spreading device can be deducted from the maps. The location detection is preferably accomplished via the recording and/or analysis of GPS data. As an alternative or in addition, the detection of discharge information on a spreading process by one or more agricultural spreading devices includes the detection, in particular the continuous detection, of the adjusted dispensing point of the agricultural material to be spread onto at least one distribution disc of the respective agricultural spreading device during the respective spreading process. The dispensing point of material to be spread can be adjusted, for example, manually by the user of the spreading device and/or automatically by the spreading device. If the dispensing point is adjusted manually, the detection of the adjusted dispensing point can include the provision of corresponding adjustment information by the user of the spreading device, in particular by means of a suited input device. Spreading devices wherein the dispensing point is automatically adjusted during the discharge process usually have a sensory mechanism suited for detecting the adjusted dispensing point. As an alternative or in addition, the detection of discharge information on a spreading process by one or more agricultural spreading devices includes the detection, in particular the continuous detection, of the distribution of material to be spread during the respective spreading process. The detection of the distribution of material to be spread during the respective spreading process can include, for example, the detection of the transverse distribution and/or the detection of the longitudinal distribution of material to be spread during the respective spreading process. As an alternative or in addition, the detection of discharge information on a spreading process by one or more agricultural spreading devices includes the detection, in particular the continuous detection, of the adjusted disc speed of the at least one distribution disc of the respective agricultural spreading device during the respective spreading process.

In the sense of the invention, a continuous detection can be understood both as an uninterrupted detection and as a periodical detection.

In a further embodiment of the method according to the invention, the detection, in particular the continuous detection, of the distribution of material to be spread during the respective spreading process includes the detection, in particular the continuous detection, of the ejection angle and/or the flying range of material to be spread during the respective spreading process, the detection, in particular the continuous detection, of properties of at least one spreading fan during the respective spreading process, and/or the detection, in particular the continuous detection, of the intended and/or actual working width during the respective spreading process. In particular, the detection of the ejection angle, the flying range, the properties of the at least one spreading fan, and/or the actual working width is accomplished by means of one or more sensors, in particular optical sensors and/or radar sensors. The one or more sensors are preferably arranged above the at least one distribution disc and adapted to detect the ejected material to be spread. In particular, the one or more sensors are arranged at a container for material to be spread of the agricultural spreading device and/or fixed and/or adapted to detect the shape of the spreading fan. The flying range of material to be spread is in particular ascertained via a detected change of the speed of the ejected material to be spread during the respective spreading process.

The method according to the invention is advantageously further developed in that the detection of discharge information on a spreading process by one or more agricultural spreading devices includes the detection of the distribution disc type used during the respective spreading process and/or the detection of the disc speed configuration during the respective spreading process. The detection of the distribution disc type used during the respective spreading process can be accomplished, for example, by a readout device which is adapted to read out an information carrier of a mounted distribution disc. As an alternative or in addition, the detection of the distribution disc type used during the respective spreading process can be accomplished via a manual input of corresponding information by a user, in particular using an input device of the respective agricultural spreading device.

In a further development of the method according to the invention, the detection of discharge information on a spreading process by one or more agricultural spreading devices includes the provision of an input option for a user which permits the user to provide a type of material to be spread, in particular a class designation, of material to be spread which is to be discharged or has been discharged. Preferably, an input device of the respective agricultural spreading device permits a manual provision of corresponding information by a user. The input device can be embodied, for example, as a touch screen and/or can comprise one or more buttons and/or keys.

In a preferred embodiment of the method according to the invention, the sending of the detected and/or recorded discharge information from the respective spreading devices to the analysis device is accomplished at least partially wirelessly, in particular via radio communication. For example, the sending is accomplished using mobile communications. For example, the detected and/or recorded discharge information can be sent directly from the respective spreading devices to the analysis device. As an alternative or in addition, the detected and/or recorded discharge information can be sent from the respective spreading devices first to an intermediate device which then forwards the discharge information to the analysis device. As intermediate devices, for example, mobile terminal equipment, in particular mobile stations, are possible.

The object underlying the invention is furthermore achieved by a method for discharging material to be spread of the type mentioned in the beginning, wherein the method according to the invention includes the retrieval of a relationship between a dispensing point of material to be spread onto at least one distribution disc of the agricultural spreading device and a distribution of material to be spread, said relationship depending on the inclination of an agricultural spreading device, wherein the relationship has been ascertained using the method for detecting the influence of the inclination of an agricultural spreading device on the distribution of material to be spread.

Preferably, the automatic adjustment of the dispensing point of material to be spread onto the at least one distribution disc is accomplished in response to the detected inclination of the agricultural spreading device according to the retrieved relationship between the dispensing point of material to be spread onto the at least one distribution disc of the agricultural spreading device and the distribution of material to be spread, said relationship depending on the inclination of the agricultural spreading device.

In addition to the dispensing point of material to be spread onto the at least one distribution disc, other adjustment parameters, such as the disc speed of the spreading device, can also be adjusted in response to the detected inclination of the agricultural spreading device during the discharge of the agricultural material to be spread on the usable agricultural area. For example, the method includes the automatic adjustment of the disc speed of the at least one distribution disc in response to the detected inclination of the agricultural spreading device during the discharge of material to be spread on the usable agricultural area. Preferably, the automatic adjustment of the disc speed of the at least one distribution disc is accomplished in response to the detected inclination of the agricultural spreading device according to the retrieved relationship between the disc speed of the at least one distribution disc of the agricultural spreading device and the distribution of material to be spread, said relationship depending on the inclination of the agricultural spreading device.

The retrieved relationship between a dispensing point of material to be spread onto at least one distribution disc of an agricultural spreading device and a distribution of material to be spread is based on provided discharge information from a plurality of different spreading devices and is extremely precise for this reason. The consideration of this relationship in the automatic adjustment of the dispensing point of material to be spread onto at least one distribution disc in response to the detected inclination of the agricultural spreading device thus results in an extremely precise discharge of material to be spread, without a monitoring of the spreading fan being required for a subsequent open- or closed-loop correction control. The method according to the invention for discharging material to be spread also permits spreading devices that do not have any sensory spreading fan detection an extremely precise discharge of material to be spread on inclined usable agricultural areas.

The object underlying the invention is furthermore achieved by an analysis device of the type mentioned in the beginning, wherein the analysis device according to the invention comprises a reception device and a calculation device. The reception device is adapted to receive discharge information on spreading processes of agricultural spreading devices. The calculation device is adapted to ascertain, on the basis of the received discharge information, a relationship between a dispensing point of material to be spread onto at least one distribution disc of an agricultural spreading device and a distribution of material to be spread, said relationship depending on the inclination of the agricultural spreading device. The relationship between the dispensing point of material to be spread onto the at least one distribution disc of the agricultural spreading device and the distribution of material to be spread, said relationship depending on the inclination of the agricultural spreading device, can also consider the disc speed of the at least one distribution disc of the agricultural spreading device.

By means of the analysis device according to the invention, thus discharge information on a plurality of spreading processes are collected and analysed to be able to determine the relationship between the device's inclination, dispensing point and distribution of material to be spread as precisely as possible. The analysis device is preferably embodied as part of a central computer system, for example a server device.

The analysis device according to the invention is furthermore advantageously embodied in that the calculation device is adapted to ascertain a dispensing point profile depending on the inclination, the dispensing point profile depending on the inclination permitting agricultural spreading devices to adjust the dispensing point in response to a detected inclination. Preferably, the analysis device permits the retrieval, in particular the online retrieval, of the ascertained relationship between the device's inclination, dispensing point and distribution of material to be spread, and/or the retrieval, in particular the online retrieval, of the ascertained dispensing point profile depending on the inclination. The dispensing point profile depending on the inclination can also consider the disc speed, such that the dispensing point profile depending on the inclination permits agricultural spreading devices to adjust the dispensing point and the disc speed in response to a detected inclination. As an alternative or in addition, the calculation device is adapted to ascertain a disc speed profile depending on the inclination, wherein the disc speed profile depending on the inclination permits agricultural spreading devices to adjust the disc speed in response to a detected inclination.

In a further development of the analysis device according to the invention, the latter is adapted to be used in a method for detecting the influence of the inclination of an agricultural spreading device on the distribution of material to be spread according to one of the above-described embodiments. With regard to the advantages and modifications of a corresponding analysis device, reference is made to the advantages and modifications of the method according to the invention for detecting the influence of the inclination of an agricultural spreading device on the distribution of material to be spread.

The analysis device according to the invention can be employed, for example, in a system which comprises, apart from the analysis device, a plurality of spreading devices. The respective spreading devices can comprise, for example, a device for monitoring the distribution of material to be spread which is adapted to detect the inclination of the respective agricultural spreading device, the ejection angle, and/or the flying range of material to be spread of the respective spreading device, and/or properties of at least one spreading fan of the respective spreading device during the discharge process. As an alternative or in addition, the respective spreading devices can comprise a sending device which is adapted to send the detected discharge information to an analysis device. As an alternative or in addition, the respective spreading devices can comprise a retrieval device which is adapted to retrieve a relationship between a dispensing point of material to be spread onto at least one distribution disc of an agricultural spreading device and a distribution of material to be spread, said relationship depending on the inclination of an agricultural spreading device, in particular by online retrieval. As an alternative or in addition, the respective spreading devices can comprise an adjustment device which is adapted to automatically adjust the dispensing point of material to be spread onto at least one distribution disc in response to the retrieved relationship. The flying range of material to be spread is in particular ascertained via a detected change of the speed of the ejected material to be spread during the respective spreading process.

BRIEF DESCRIPTION OF THE DRAWING FIGURE

Below, a preferred embodiment of the invention will be illustrated and described more in detail with reference to the enclosed drawing. Here, FIG. 1 shows a system with an analysis device according to the invention in a schematic representation.

DETAILED DESCRIPTION

According to the FIGURE, the system 200 comprises an analysis device 10 and several agricultural spreading devices 100a-100c, 102 embodied as fertiliser spreader. The analysis device 10 is part of a central computer system.

The spreading devices 100a-100c perform, together with the analysis device 10, a method for detecting the influence of the inclination α1-α4 of an agricultural spreading device 100a-100c, 102 on the distribution of material to be spread.

The spreading devices 100a-100c each comprise two adjacently arranged distribution discs 104a-104c, 106a-106c onto which material to be spread, i. e. fertiliser, is dispensed via a metering system. The dispensing point of material to be spread onto the respective distribution discs 104a-104c, 106a-106c is variable for adapting the distribution of material to be spread. Moreover, the spreading devices 100a-100c each comprise devices 112a-112c, 114a-114c for monitoring the distribution of material to be spread. The devices 112a-112c, 114a-114c are each arranged above a distribution disc 104a-104c, 106a-106c and each comprise several optical sensors for detecting the spreading fan. Via the optical sensors, the ejection angle and the flying range of material to be spread are also detected during the discharge process.

The usable agricultural areas F onto which the spreading devices 100a-100c discharge material to be spread each have an inclination α1-α3, so that the spreading devices 100a-100c are also correspondingly inclined during the discharge. The spreading devices 100a-100c furthermore comprise inclination sensors via which the device's current inclination can be detected.

The spreading devices 100a-100c record discharge information on the performed spreading process during the discharge process. The detection of the discharge information here includes the continuous detection of the inclination α1-α3 of the respective agricultural spreading device 100a-100c, the continuous detection of the adjusted dispensing point of material to be spread onto the distribution discs 104a-104c, 106a-106c of the respective agricultural spreading device 100a-100c, and the continuous detection of the distribution of material to be spread during the respective spreading process. During the continuous detection of the distribution of material to be spread, both the respective transverse distribution and the respective longitudinal distribution of material to be spread are continuously detected. Furthermore, the respective ejection angle and the flying range of material to be spread are continuously detected.

Moreover, the spreading devices 100a-100c detect which distribution disc type is used to discharge the material to be spread and which class of fertiliser is discharged. To this end, the spreading devices 100a-100c each have an input device embodied as a touch screen via which the user can enter the distribution disc type and the fertiliser class. For example, a list of distribution disc types and/or fertiliser classes is displayed to the user from which he or she can select the used distribution disc type and the discharged or to be discharged fertiliser class.

The discharge information recorded and detected by the spreading devices 100a-100c are then sent from the respective spreading devices 100a-100c to the analysis device 10. The sending of the discharge information from the respective spreading devices 100a-100c to the analysis device 10 is accomplished wirelessly via the radio links 202a-202c.

The analysis device 10 is adapted to detect the influence of the inclination α1-α4 of an agricultural spreading device 100a-100c, 102 on the distribution of material to be spread. To this end, the analysis device 10 comprises a reception device 12 by means of which the analysis device 10 receives the discharge information sent from the spreading devices 100a-100c. The received discharge information of the spreading devices 100a-100c include indications on the inclination α1-α3 of the respective agricultural spreading device 100a-100c, indications on the adjusted dispensing points of material to be spread onto the distribution discs 104a-1004c, 106a-106c of the respective agricultural spreading device 100a-100c, and indications on the distribution of material to be spread during the respective spreading process. The indications on the distribution of material to be spread during the respective spreading process include indications on the ejection angle and the flying range of material to be spread. The discharge information moreover include indications on the distribution disc type used during the respective spreading process and indications on the discharged fertiliser class.

Furthermore, the analysis device 10 comprises a calculation device 14 by means of which the analysis device 10 ascertains, on the basis of the received discharge information, a relationship between a dispensing point of material to be spread onto a distribution disc 104a-104c, 106a-106c, 108, 110 of an agricultural spreading device 100a-100c, 102, and a distribution of material to be spread, said relationship depending on the inclination α1-α4 of an agricultural spreading device 100a-100c, 102.

The calculation device 14 of the analysis device calculates, on the basis of the received discharge information, dispensing point profiles depending on the inclination which permit agricultural spreading devices 100a-100c, 102 to adjust the dispensing point in response to a detected inclination α1-α4. The dispensing point profiles depending on the inclination are then provided by the analysis device for online retrieval for agricultural spreading devices 100a-100c, 102.

The spreading device 102 also has two distribution discs 108, 110, but it does not have any device for monitoring the distribution of material to be spread, so that an unexpected faulty discharge occurring as a consequence of an inclined section of the usable agricultural area F cannot be determined and corrected. The discharge precision of the spreading device 102 on an inclined surface thus substantially depends on a relationship between the device's inclination, dispensing point and distribution of material to be spread stored within the device.

The analysis device 10 provides such relationships for online retrieval with the generated dispensing point profiles. The provided dispensing point profiles define the relationship between the device's inclination, dispensing point and distribution of material to be spread very precisely due to the high amount of data and information, respectively, on which the calculation of the discharge profiles is based.

The spreading device 102 comprises a retrieval device by means of which corresponding dispensing point profiles can be retrieved from the analysis device 10. The analysis device 10 comprises a sending device 16 for sending the ascertained dispensing point profiles. The data transmission between the analysis device 10 and the spreading device 102 is accomplished via the radio link 204. Moreover, the spreading device 102 has an adjustment device which is adapted to automatically adjust the dispensing point of material to be spread onto the distribution discs 108, 110 in response to the retrieved dispensing point profile.

Thus, the spreading device 102 benefits from the sensory mechanism of the spreading devices 100a-100c, whereby the discharge precision of the spreading device 102 on inclined usable agricultural areas F is increased.

Moreover, the spreading devices 100a-100c also each have one retrieval device by means of which corresponding dispensing point profiles can be retrieved from the analysis device 10.

REFERENCE NUMERALS

- 10 analysis device
- 12 reception device
- 14 calculation device
- 16 sending device
- 100a-100c agricultural spreading devices
- 102 agricultural spreading device
- 104a-104c distribution discs
- 106a-106c distribution discs
- 108 distribution disc
- 110 distribution disc
- 112a-112c devices for monitoring the distribution of material to be spread
- 114a-114c devices for monitoring the distribution of material to be spread
- 200 system
- 202a-202c radio links
- 204 radio link
- F usable agricultural areas
- $\alpha 1$-$\alpha 4$ inclinations

The invention claimed is:

1. A method for detecting the influence of the inclination of an agricultural spreading device on the distribution of material to be spread, the agricultural spreading device comprising a metering system for the material to be spread and at least one rotatable distribution disc onto which the material to be spread is dispensed via the metering system, the method comprising:
   receiving discharge information on spreading processes from agricultural spreading devices by an analysis device; and
   ascertaining a relationship between a dispensing point of spreading material onto at least one distribution disc of an agricultural spreading device and a distribution of material to be spread, said relationship depending on the inclination of the agricultural spreading device, by the analysis device on the basis of the received discharge information,
   wherein the dispensing point is the region where the material to be spread hits the at least one distribution disc,
   the method further comprising detecting discharge information on a spreading process by one or more agricultural spreading device;
      wherein the detection of discharge information on a spreading process by one or more agricultural spreading devices comprises at least one of the following steps:
         continuously detecting the inclination of the respective agricultural spreading device during the respective spreading process:
         continuously detecting the adjusted dispensing point of material to be spread onto at least one distribution disc of the respective agricultural spreading device during the respective spreading_process: or
         continuously detecting the distribution of material to be spread during the respective spreading process.

2. The method according to claim 1, wherein the discharge information includes indications on the inclination of the respective agricultural spreading device, indications on the adjusted dispensing point of material to be spread onto at least one distribution disc of the respective agricultural spreading device, and/or indications on the distribution of material to be spread during the respective spreading process.

3. The method according to claim 2, wherein the indications on the distribution of material to be spread during the respective spreading process include indications on the ejection angle and/or the flying range of material to be spread, indications on the properties of at least one spreading fan, and/or indications on the intended and/or actual working width during the respective spreading process.

4. The method according to claim 1, wherein the discharge information includes indications on the distribution disc type used during the respective spreading process, and/or indications on the distribution disc configuration during the respective spreading process.

5. The method according to claim 1, wherein the discharge information includes indications on the type of material to be spread, in particular a class designation of material to be spread.

6. The method according to claim 1, further comprising at least one of the following steps:
   ascertaining a dispensing point profile depending on the inclination by the analysis device, wherein the dispensing point profile depending on the inclination permits agricultural spreading devices to adjust the dispensing point in response to a detected inclination; or
   providing the dispensing point profile depending on the inclination for retrieval, in particular for online retrieval, by agricultural spreading devices.

7. The method according claim 1, further comprising at least one of the following steps:
   recording discharge information on a spreading process by one or more agricultural spreading devices; or
   sending the detected and/or recorded discharge information from the respective spreading devices to the analysis device.

8. The method according to one of claim 7, wherein the detection of discharge information on a spreading process by one or more agricultural spreading devices comprises at least one of the following steps:
   detecting the distribution disc type used during the respective spreading process; or
   detecting the distribution disc configuration during the respective spreading process.

9. The method according to one of claim 7, wherein the sending of the detected and/or recorded discharge information from the respective spreading devices to the analysis device is accomplished at least partially wirelessly, in particular via radio communication.

10. The method according to claim 1, wherein the detection, in particular the continuous detection, of the distribution of material to be spread during the respective spreading process comprises at least one of the following steps:
    detecting, in particular continuously detecting, the ejection angle and/or the flying range of material to be spread during the respective spreading process;
    detecting, in particular continuously detecting, properties of at least one spreading fan during the respective spreading process; or
    detecting, in particular continuously detecting, the intended and/or actual working width during the respective spreading process.

11. A method for discharging material to be spread with an agricultural spreading device, the agricultural spreading device comprising a metering system for the material to be spread and at least one rotatable distribution disc onto which the material to be spread is dispensed via the metering system, the method comprising:

detecting, in particular continuously detecting, the inclination of the agricultural spreading device during the discharge of material to be spread on a usable agricultural area;

automatically adjusting the dispensing point of material to be spread onto at least one distribution disc in response to the detected inclination of the agricultural spreading device during the discharge of material to be spread on the usable agricultural area; comprising the step of:

retrieving a relationship between a dispensing point of material to be spread onto at least one distribution disc of an agricultural spreading device and a distribution of material to be spread, said relationship depending on the inclination of the agricultural spreading device, wherein the relationship has been ascertained using the method for detecting the influence of the inclination of an agricultural spreading device on the distribution of material to be spread, wherein the dispensing point is the region where the material to be spread hits the at least one distribution disc.

12. An analysis device for detecting the influence of the inclination of an agricultural spreading device on the distribution of material to be spread, the agricultural spreading device comprising a metering system for the material to be spread and at least one rotatable distribution disc onto which the material to be spread is dispensed via the metering system, the analysis device comprising:

a reception device which is adapted to receive discharge information on spreading processes of agricultural spreading devices; and a calculation device which is adapted to ascertain, on the basis of the received discharge information, a relationship between a dispensing point of material to be spread onto at least one distribution disc of an agricultural spreading device and a distribution of material to be spread, said relationship depending on the inclination of the agricultural spreading device, wherein the dispensing point is the region where the material to be spread hits the at least one distribution disc, wherein the analysis device is adapted to be used in a method for detecting the influence of the inclination of an agricultural spreading device on the distribution of material to be spread according to claim 1.

13. The analysis device according to claim 12, wherein the calculation device is adapted to ascertain a dispensing point profile depending on the inclination, wherein the dispensing point profile depending on the inclination permits agricultural spreading devices to adjust the dispensing point in response to a detected inclination.

\* \* \* \* \*